United States Patent [19]

Bourelier et al.

[11] 4,136,214
[45] Jan. 23, 1979

[54] METHOD OF FORMING FILM

[75] Inventors: Claude Bourelier, Paris; Roger Orain, Vaucresson, both of France; Rudolf Pelzer, Herzogenrath, Fed. Rep. of Germany; Wolfgang Schaefer; Siegfried Schindler, both of Aachen, Fed. Rep. of Germany

[73] Assignee: Saint-Gobain Industries, Neuilly-sur-Seine, France

[21] Appl. No.: 806,453

[22] Filed: Jun. 14, 1977

[30] Foreign Application Priority Data

Jun. 18, 1976 [FR] France .................... 76 18543

[51] Int. Cl.² ............................. B05D 1/26
[52] U.S. Cl. ......................... 427/169; 118/6; 118/415
[58] Field of Search ............... 427/164, 165, 169, 168, 427/287, 8, 10, 445, 430; 118/7, 8, 6, 62, 500, 413, 415; 141/134; 198/676; 101/37, 43, 44, 38 RA; 134/48

[56] References Cited

U.S. PATENT DOCUMENTS

| | | | |
|---|---|---|---|
| 1,400,124 | 12/1921 | Wolverton | 101/37 X |
| 2,150,250 | 3/1939 | Scott | 34/23 X |
| 2,737,858 | 3/1956 | Simpson | 162/297 |
| 2,827,928 | 3/1958 | Guckel | 141/134 |
| 3,223,549 | 12/1965 | Fredley et al. | 118/62 X |
| 3,682,131 | 8/1972 | Algeri et al. | 118/8 X |
| 3,791,508 | 2/1974 | Osborne et al. | 198/676 X |

FOREIGN PATENT DOCUMENTS

| | | | |
|---|---|---|---|
| 377267 | 7/1907 | France | 118/415 |
| 388756 | 6/1908 | France | 118/415 |

Primary Examiner—Morris Kaplan
Attorney, Agent, or Firm—John T. Synnestvedt; M. Richard Page

[57] ABSTRACT

Method and apparatus for the continuous production of transparent films, sheets, or plates of high optical quality are disclosed. Material in liquid form flows onto a substrate comprising a plurality of discrete, distortion-free panels, disposed in end-to-end abutting relationship and moved continuously beneath a flow head from which the material flows onto the panels. The panels move on a conveyor system that progressively slows the speed of the plates, so that leading and trailing edges of successive panels abut to form a continuous surface as the panels pass beneath the flow head. Yieldable, elastic sealing strips are placed between the panels to form a part of the continuous surface and to cushion jolts as succeeding panels are moved from the upstream end of the conveyor and come into contact with the continuous line of panels passing beneath the flow head. Panels that are newly added to the upstream end of the line come into contact with the endmost panel in the line when the sealing strips are disposed beneath the flow head.

12 Claims, 10 Drawing Figures

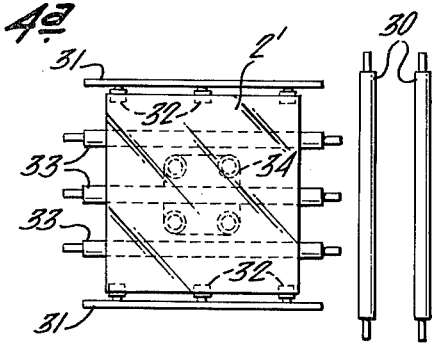
Fig.4a
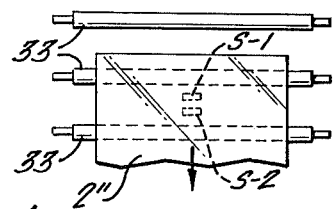
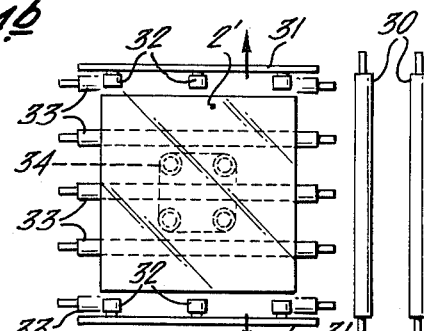
Fig.4b
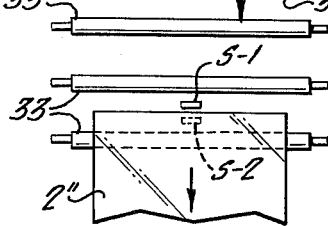
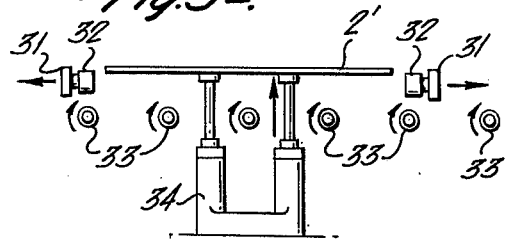
Fig.5a
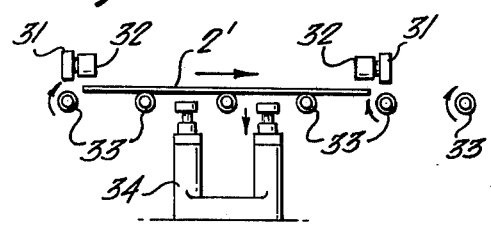
Fig.5b
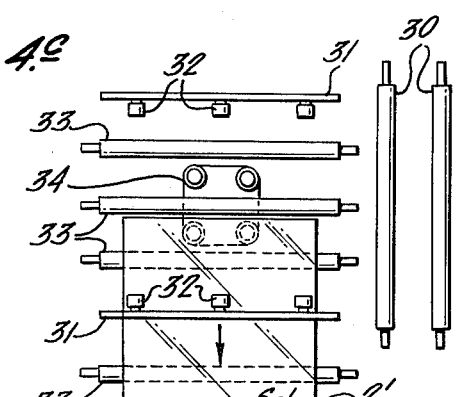
Fig.4c
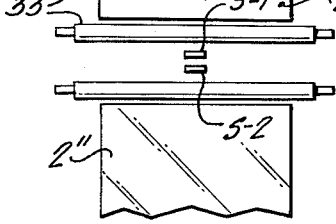

METHOD OF FORMING FILM

FIELD OF THE INVENTION

This invention relates to the production of transparent films, sheets, or plates of high optical quality by the flow of liquid material onto a continuously-moving substrate. The liquid may be in the form of a melt of the transparent material, a solution in which the transparent material is dissolved, or a mixture of flowable reactants that react to form the transparent material. More particularly, the invention relates to methods and apparatus wherein the liquid material flows onto a moving substrate on which it solidifies in the form of a continuous, transparent ribbon of synthetic polymeric material.

PRIOR REPORTED DEVELOPMENTS

One known method for the fabrication of transparent films involves the formation of the film on a continuous glass ribbon that issues from a flat glass manufacturing line. Such a method is illustrated in German DTOS Nos. 24 22 543. This method has the disadvantage that it requires the presence of a complete installation for manufacturing the flat glass.

Another known method for fabricating transparent films or sheets of high optical quality involves the use of a mold, the two major sides of which are formed by two parallel glass sheets. Such an arrangement is shown in German DTOS No. 20 40 849. In this system, thermoplastic material is poured into the mold and cools to form the desired sheet. Such systems are disadvantageous from the standpoints of production capacity and cost.

SUMMARY OF THE INVENTION

An object of the invention is the continuous production of sheets, films or plates of transparent material having two opposed parallel surfaces that are flat and consequently having a high optical quality.

According to the invention, a movable substrate or base comprising a plurality of defect-free panels or plates is utilized to form a continuous surface onto which the transparent material, in liquid form, is disposed. In the preferred embodiment, the panels are glass plates. A series of plates, one plate behind the other, is placed on a conveyor located under the flow head. Each glass that is placed on the upstream end of the conveyor comes into contact with the preceeding plate at the time when a joint separating two successive preceeding plates is passing under the flow head.

Also according to the invention, because the plates pass beneath the flow head at a uniform speed, the resulting film, sheets, or plates meet the highest requirements for optical quality.

The use of a succession of separated plates to form the movable substrate has the disadvantage that the resulting film thins out, not only on the edges, but also in the zones next to the leading and trailing edges of each of the plates, because a portion of the liquid mass enters the spaces between successive plates. This reduces the usable surface area of each sheet.

If, in order to avoid this disadvantage, the plates are pushed one after the other onto a continuous conveyor with their edges touching, optical disturbances result, apparently because of the jolting of each successive plate in the line as successive plates are placed on the upstream end of the line and come into contact with the endmost plate in the continuous line of plates.

This invention avoids the foregoing disadvantages by reason of the fact that, at the time each successive plate that is added to the upstream end of the line of plates comes into contact with the endmost plate in the line, the line is so arranged that a joint between successive plates is located under the flow head. Therefore, any jolting that results from the engagement of the newly-added plate to the end of the moving line of plates always occurs at the moment when the portion of the ribbon of transparent material is being formed, which overlies the joint, a portion which will later be eliminated because it is in a transition zone between successive sheets that are separated from the continuous ribbon.

According to one aspect of the invention, a strip of elastic deformable material is placed between adjoining edges of consecutive plates. THe strip of elastic material lessens the intensity of the shock or jolt that results each time a new plate is added to the line, and also forms a joint between consecutive plates that is impervious to the liquid being deposited on the plates. Preferably, the elastic material comprises a synthetic, open-celled foam. The strips of elastic material can be adhered to the leading and trailing edges of each glass plate.

According to another aspect of the invention, the conveyor system for the line of plates has, at least in the zone where the flow head is located, a broad support surface for preventing flexure of the individual glass plates. This avoids the formation of optical defects that might otherwise occur because of a slight curvature of the moving panel in the critical zone where the liquid material flows onto the plate. In a preferred embodiment, the broad support zone includes closely spaced transport rollers or a table providing a gaseous cushion for supporting the plates.

Further, it has been found possible to obtain plastic sheet materials with virtually flat parallel sides, consequently very homogeneous, if the flow head utilized comprises a casting head as disclosed in copending U.S. patent application Ser. No. 783,343 of Rudolf Pelzer and Heinz Scholl, filed Mar. 31, 1977.

According to another aspect of the invention, it is desirable to control the conveyor for the moving line of plates in such a way that the elastic strips between the glass plates are held constantly compressed between successive plates. This results from having the speed of the line at the downstream end slightly less than the speed at the upstream end. One way of accomplishing this is to decrease the speed of the drive rollers of the conveyor progressively from the upstream to the downstream end of the conveyor.

Other characteristics and advantages of the invention will become evident from the following description of the preferred embodiment.

DESCRIPTION OF THE PREFERRED EMBODIMENT

FIG. 4a–4c schematically illustrate a structural arrangement and sequence for feeding plates into contact with a moving line of plates.

FIG. 5a and 5b are partial schematic elevational view of a means shown in FIG. 4a–4c for the placement of plates on a conveyor section.

Figure 1:
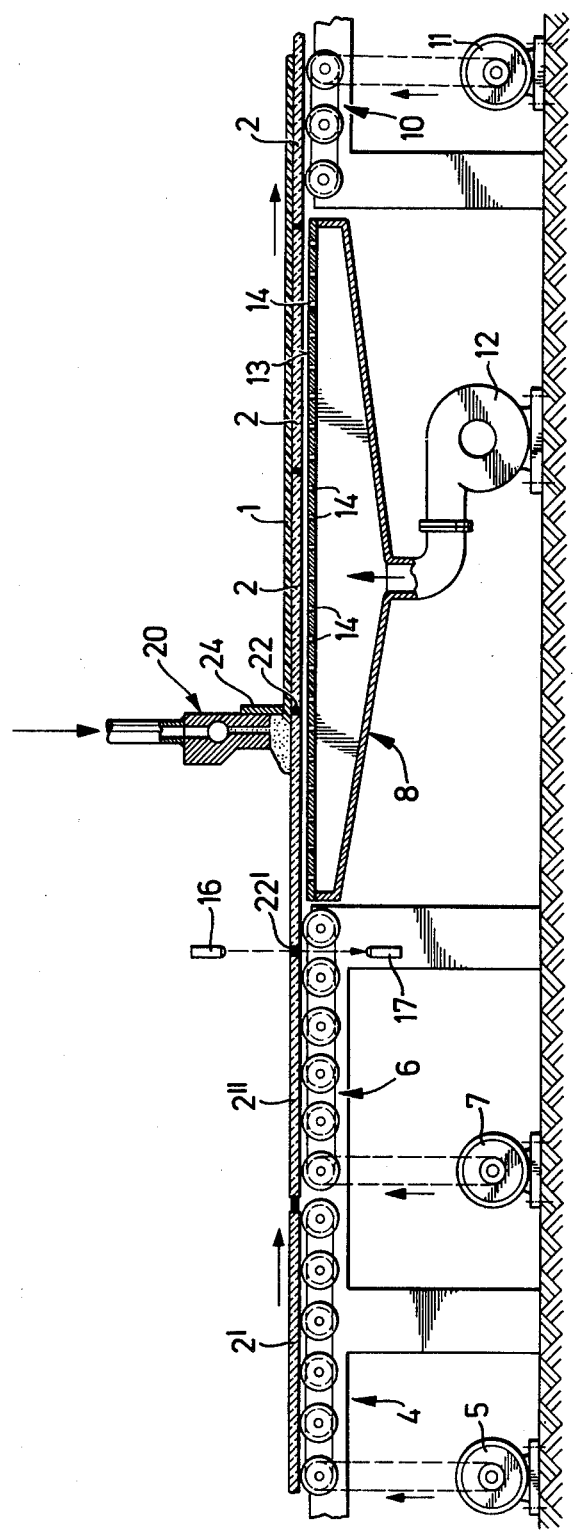
FIG. 1 is an elevational view, in longitudinal cross-section, of the film forming apparatus according to the invention employing a movable substrate or base.

Referring to FIG. 1, the movable substrate on which the film of transparent material is disposed comprises a series of defect-free glass plates 2, placed one behind the other on a horizontal conveyor that moves the plates by pushing them, one against the other. Preferably, the plates 2 are formed of glass.

The conveyor comprises a first section 4 with rollers driven by a drive motor 5 and a second section 6 having rollers driven by a drive motor 7, a table 8 for providing a gaseous cushion and, finally, a third conveyor section 10 with rollers driven by drive motor 11. The table 8 comprises a foraminous surface 13, provided with holes 14, that is disposed over top of a closed chamber. The chamber beneath the foraminous plate 13 is supplied with air under pressure by a blower 12. The air that escapes through the holes 14 forms a cushion of air beneath successive glass plates 2 of the moving substrate, on which cushion the glass plates slide. Alternatively, the table 8 can be replaced by a conveyor section with closely spaced rollers, some or all of which are driven at a suitable speed.

A flow head 20 having a doctor blade 24 is located above a portion of the glass plates 2 that is supported by the air cushion from the table 8. The apparatus also includes a detector means comprising, for example, a photocell arrangement including a transmitter 16 and a receiver 17. The purpose of the detector means is to detect the presence of the joints, for example joints 22 and 22', formed by compression of sealing strips between successive glass plates, as illustrated in FIGS. 2b and 3b.

In operation, the glass plates are first individually fed onto the conveyor section 4. Conveyor section 4 is driven at a speed above the speed of conveyor section 6 so that each plate of glass, as it comes on section 4, is accelerated toward the endmost plate of a continuous line of plates that move along the conveyor. Referring to FIG. 1, the plate 2' has been accelerated by the conveyor section 4 and has just come into abutment with endmost plate 2" of the continuous line of plates comprising plate 2" and the two plates designated by the reference numeral 2.

From the speed of the conveyor section 6 and from the moment at which the joint 22 crosses the rays from the transmitter 16, the interval of time at the end of which the joint 22 passes under the doctor blade 24 can be deduced, because the distance between the detector means and the doctor blade is known. This interval of time governs the moment when a plate, for example plate 2', is placed on the conveyor section 4. The speed of conveyor section 4 is above that of the conveyor section 6 and is set so that within a certain time period the glass plate 2' contacts the preceeding plate 2", the contact occurring at the exact moment when the joint 22 is under the doctor blade 24.

An alternative control system, utilizing limit switches in place of the photocell arrangement described above, is illustrated in FIGS. 4a–4c and FIGS. 5a and 5b. In this arrangement, a plate 2' is received from conveyor rolls 30 onto a support comprising oppositely disposed frame members 31 that carry rollers 32 for supporting the plate 2' above conveyor rollers 33 that can, with reference to FIG. 1, comprise conveyor section 4.

In FIG. 4a, a second plate, plate 2" is shown travelling on the rollers 33 toward the flow head. The plate 2" passes over switches S-1 and S-2 that are held in open position by the plate 2".

When the trailing edge of plate 2" clears switch S-1, as shown in FIG. 4b, the switch closes and initiates the raising (by suitable means such as hydraulic or electric motors, not shown) of support posts 34 to engage the plate 2'. Thereafter, the support frames 31 are moved laterally apart so that the plate 2' is supported only on the posts 34, as shown in FIG. 5a. The movement of frames 31 can be accomplished by suitable means, for example fluid motors (not shown).

Referring to FIG. 4c, after the trailing edge of plate 2" clears the switch S-2, this switch closes and causes the support posts 34 to lower the plate 2' onto the rollers 33.

The plate 2" travels from the conveyor 4 onto the conveyor section 6, the rollers of which travel at a lower speed than the rollers of conveyor section 4 and as a consequence, plate 2" slows down. While on conveyor section 6, the plate 2" has come into abutment with the next preceeding plate in the series of plates being coated.

It is desired to have plate 2' come into abutment with plate 2" at a time when a joint is located under the doctor blade and thus the abutment should occur at a point spaced one plate length, or a multiple of plate lengths from the doctor blade. As shown in FIG. 1, the location of abutment of plate 2' to plate 2" occurs two plate lengths from the doctor blade 24. The distance from the point of desired abutment to the location where the plate 2' is placed on conveyor section 4 is known. Also, the time necessary for the trailing edge of plate 2" to reach the abutment point can be determind from the speed of conveyor section 6. The leading edge of plate 2' must, in the same amount of time, reach the abutment point. As the distance and time are known, the speed of conveyor section 4 necessary to achieve abutment of the plate 2' at the desired location, can be determined.

Figure 2A:
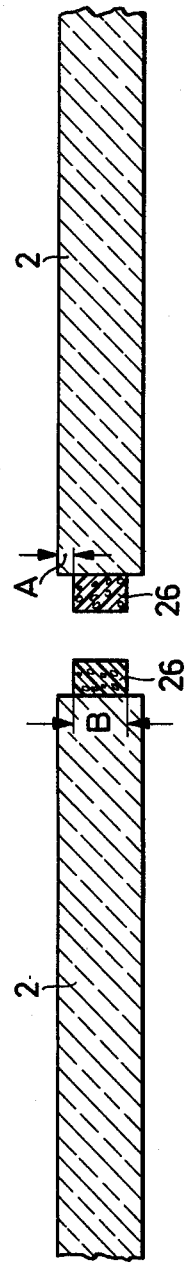
FIG. 2a shows one arrangement of deformable, elastic sealing strips desposed on adjoining edges of glass plates.
Figure 2B:
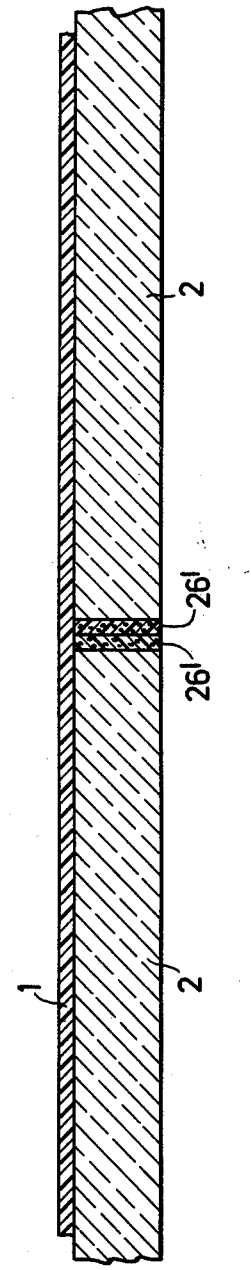
FIG. 2b shows the plates as shown in FIG. 2a in abutting relationship with a film of transparent material disposed on the plates and on the joint between the plates formed by the sealing strips.

With reference to FIGS. 2a, b and 3a, b, strips of elastic material are placed between facing ends or edges of glass plates 2. Preferably, the plastic material is a synthetic open-celled foam. As long as the glass plates 2 are pushed against each other, the strips are compressed and enlarge upwardly as well as downwardly; therefore, it is advantageous that the strips have a width less than the thickness of the plates 2. As shown in FIG. 2a, strips 26 of a width B, less than the thickness of the glass plates, is adhered to an edge of the glass plate at a distance A from the upper surface of the plate. Under compression between adjacent plates, the strips take the form indicated at 26' in FIG. 2b, wherein their upper edges are even with the upper surface of plates 2.

Figure 3A:
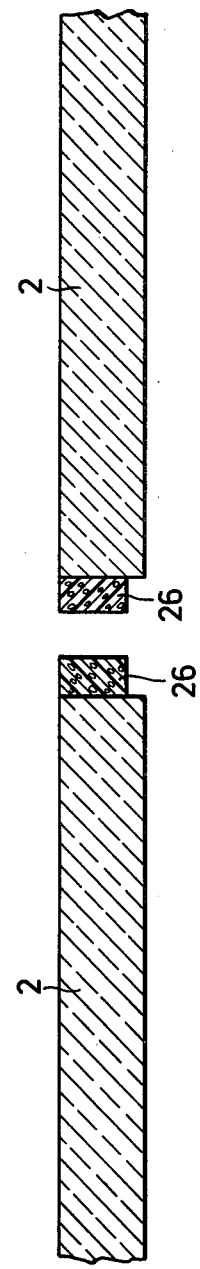
FIG. 3a illustrates a second arragement of deformable, elastic strips on adjoining edges of glass plates.
Figure 3B:
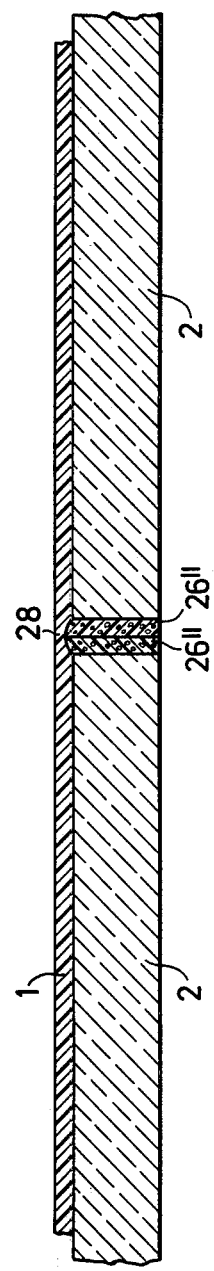
FIG. 3b shows the plates of FIG. 3a in abutting relationship with a film of transparent material disposed on the plates and on the joint between the plates formed by the sealing strips.

The strips can also be placed as shown in FIG. 3a, that is, near the upper surface of the plates 2. When the strips are placed under compression, the strips take the form 26" as shown in FIG. 3b, and project above the plane of the movable substrate. This produces a local thinning out of the film 1, identified by reference numeral 28 in FIG. 3b. This creates a weakened line that has the advantage of facilitating separation of the film 1 into separate sheets by tearing the film 1 along the weakened line.

In the use of the method and apparatus described, it is possible to place one or more other layers on the transparent film 1, particularly an adhesive layer tha enables final adhesion, in a tenacious manner, of the sheets of the film 1 onto another support, for example, a sheet of glass or transparent plastic.

The system disclosed has been found especially useful for forming films of transparent, self-healing polyurethanes, such as those disclosed in U.S. Pat. No. 3,979,548 of excellent optical quality and for applying adhesives to such films. These films are used to form antilacerative, scratch resistant layers on automobile windscreens. It should be realized that in order to obtain films of suitable optical quality the coating method disclosed takes place within a dust-free enclosure.

We claim:

1. In a method for making films by depositing, from a flow head, a layer of flowable material onto a moving substrate formed of a series of panels arranged in end-to-end abutting relationship and maintaining the substrate continuous by adding panels successively to the series of panels, the improvement comprising abutting each newly added panel with the endmost panel in the series of panels when a joint between preceding panels in the series is beneath the flow head.

2. A method according to claim 1 and further comprising applying a strip of yieldable material to an edge of a panel that is to abut with another panel in the series.

3. A method as in claim 2 wherein the yieldable material is an elastic, open-celled foam.

4. A method according to claim 1 and further comprising applying strips of yieldable material on opposed edges of each panel that is added to the moving series of panels.

5. A method as in claim 2 wherein the strip of yieldable material is applied on an edge portion of the panel a slight distance from the upper surface of the panels so that the strip becomes even with the upper surface of the panel when the strip is compressed.

6. A method as in claim 2 wherein the strip of yieldable material is applied on an edge portion of a panel close enough to the upper surface of that panel so that when the strip is compressed, the upper edge of the strip projects above the upper surface of the panel for creating a local thinning of the film.

7. A method as in claim 2 wherein at least a portion of the series of panels is supported on a gaseous cushion.

8. In a method for making films by depositing, from a flow head, a layer of flowable material onto a moving substrate formed of a series of panels arranged in end-to-end abutting relationship and maintaining the substrate continuous by adding panels successively to the series of panels, the improvement comprising applying a yieldable sealing element between adjoining edges of successive panels in the series and abutting each newly added panel with the endmost panel in the series of panels when a joint between preceding panels in the series is beneath the flow head.

9. A method as in claim 8 wherein the deformable sealing elements are strips of elastic foam material.

10. In a method for making transparent films of high optical quality by depositing, from a flow head, a layer of flowable material onto a moving substrate formed of a series of glass plates arranged in end-to-end abutting relationship and maintaining the substrate continuous by adding plates successively to the series of plates, the improvement comprising conveying each newly added plate into abutment with the endmost plate in the series of plates when a joint between preceding plates in the series is beneath the flow head.

11. A method for forming films comprising flowing a flowable material onto a moving substrate, the substrate comprising a series of panels arranged in end-to-end abutting relationship, forming a film on the substrate by passing the substrate, with the flowable material thereon, beneath a doctor blade, maintaining the substrate continuous by adding panels to the moving series of panels, and timing the abutting of each newly added panel with the endmost panel of the series to occur when a joint between preceeding panels in the series is disposed beneath the doctor blade.

12. A method as in claim 11 including applying an elastic sealing strip to at least one edge of each panel prior to abutment with the moving series of panels.

* * * * *